United States Patent [19]

Carrico

[11] Patent Number: 5,454,543
[45] Date of Patent: Oct. 3, 1995

[54] AUTOMOBILE AIR-CONDITIONER COMPRESSOR MOUNTING REPAIR ASSEMBLY AND METHOD OF REPAIRING AN AIR-CONDITIONER COMPRESSOR HAVING A BROKEN MOUNTING EAR

[76] Inventor: John D. Carrico, 813 Mildred, Cahokia, Ill. 62206

[21] Appl. No.: 134,000

[22] Filed: Oct. 12, 1993

[51] Int. Cl.⁶ .................................................... F16M 5/00
[52] U.S. Cl. .......................................... 248/674; 248/672
[58] Field of Search .................................... 248/674, 675, 248/671, 672, 673, 637, 205.1; 417/360

[56] References Cited

U.S. PATENT DOCUMENTS

| | | | |
|---|---|---|---|
| 4,147,318 | 4/1979 | McDonald | 248/672 X |
| 4,514,105 | 4/1985 | Adams et al. | 248/674 X |
| 4,597,555 | 7/1986 | Weihsmann | 248/672 |
| 5,069,415 | 12/1991 | Mechalas | 248/674 |

*Primary Examiner*—Ramon O. Ramirez
*Attorney, Agent, or Firm*—Polster, Lieder, Woodruff & Lucchesi

[57] ABSTRACT

An assembly and method for repairing an automobile air-conditioner compressor of the type having bored projecting ears located circumferentially about the compressor housing, wherein a bored ear has been broken away from the housing. The assembly can comprise a generally C-shaped bracket and a replacement aperture located approximately equidistant between the ends of the bracket. The assembly has means to be connected to at least two bored projecting ears so that the bracket replacement aperture firmly occupies the position previously occupied by the bore of the broken projecting ear.

5 Claims, 1 Drawing Sheet

AUTOMOBILE AIR-CONDITIONER COMPRESSOR MOUNTING REPAIR ASSEMBLY AND METHOD OF REPAIRING AN AIR-CONDITIONER COMPRESSOR HAVING A BROKEN MOUNTING EAR

FIELD OF THE INVENTION

This invention relates to a method and apparatus for repairing automobile air-conditioner compressors whose mounting ears have been broken.

BACKGROUND AND SUMMARY OF THE INVENTION

Automobile air-conditioner compressors have a generally uniform housing, with two sets of four bored projecting ears. The ears are used to mount the compressor to the framework of an automobile chassis. Each set of ears is arranged circumferentially around the compressor housing with the ears of each set spaced in approximately ninety degree increments. The ears are typically made of aluminum. The vibration experienced by the compressor fatigues the aluminum ears over time, frequently causing the ears to break. This problem is especially acute with automobiles such as diesel trucks.

In the past these broken ears could not be repaired, which required the entire air-conditioner compressor to be replaced if a single ear broke. In addition to the compressor cost and labor expense, replacing the air-conditioner compressor required the freon from the old system to be removed and fresh freon to be added, which carried a risk that freon would escape into the atmosphere causing damage to the atmospheric ozone layer. This total replacement was an expensive solution to the problem of a broken compressor projecting ear.

The present invention overcomes the foregoing problems by providing an assembly and method for repairing an automobile compressor having a broken projecting ear, as well as an assembly and method for providing reinforcement of mounting a compressor to prevent or delay the breaking of a projecting ear. The assembly of the present invention comprises, in a preferred embodiment, a generally C-shaped bracket that extends about the compressor. The bracket can be comprised of two plates which are separated by a spacer. The apparatus comprises means for connecting the bracket to the two projecting ears located about ninety degrees from the broken ear. The bracket can have an aperture which securely occupies the position previously occupied by the bore of the broken ear when the bracket is mounted.

Generally the method of the present invention comprises the steps of connecting one end of the generally C-shaped bracket to a projecting ear approximately ninety degrees away from the broken ear. Next, connecting the other end of the bracket to the other projecting ear located approximately ninety degrees from the broken ear, such that the aperture of the bracket securely occupies the position previously occupied by the bore of the broken ear. After the bracket is properly connected to the air-conditioner compressor, the spacer can be placed between the plates, and the compressor can be remounted to the existing air-conditioner system thereby eliminating the need to replace the compressor.

The apparatus and method of the present invention eliminates the need to replace an entire air-conditioner compressor when a projecting ear breaks, which saves significant material and labor expense. This inexpensive solution to a broken compressor ear also eliminates the need to evacuate the freon from the existing air-conditioner system thereby reducing the possibility of freon escaping into the atmosphere and damaging the earth's ozone layer.

BRIEF DESCRIPTION OF THE DRAWINGS

In the accompanying drawings which form a part of the specification and are to be read in conjunction therewith, and in which like reference numerals are used to indicate like parts in the various views.

DETAILED DESCRIPTION OF THE PREFERRED EMBODIMENT

Figure 1:
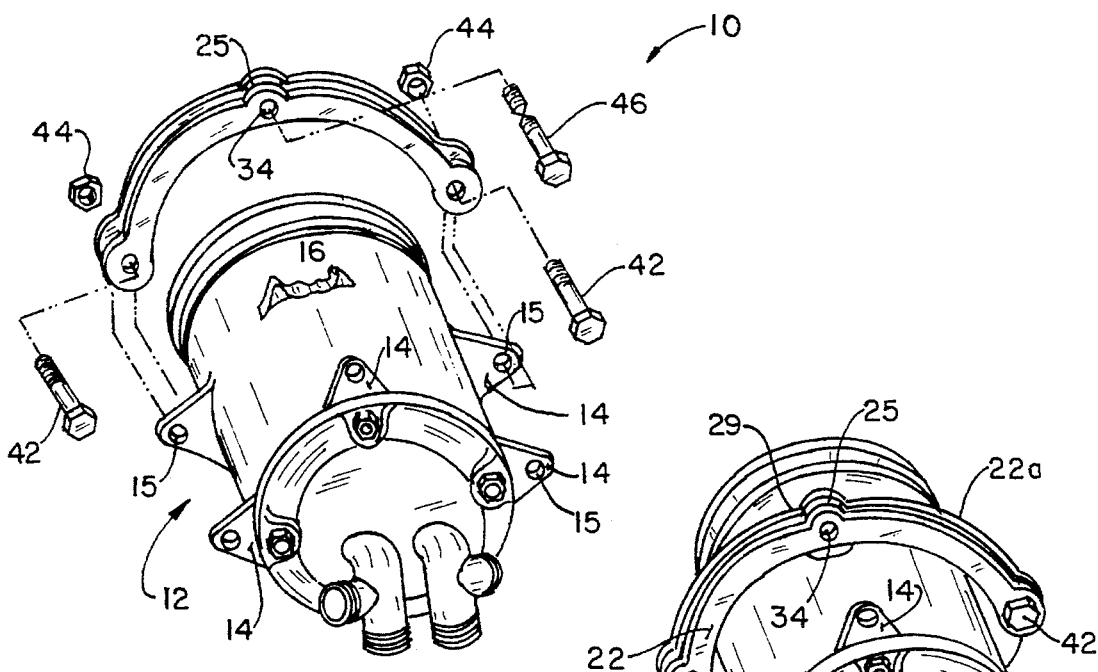
FIG. 1 is an isometric view of the air-conditioner compressor mounting repair assembly constructed according to the principles of the present invention in relation to a standard air-conditioner compressor having a broken projecting ear, prior to connecting the bracket to the compressor, with the lower front ear not shown, and the top bolt shown broken.
Figure 2:
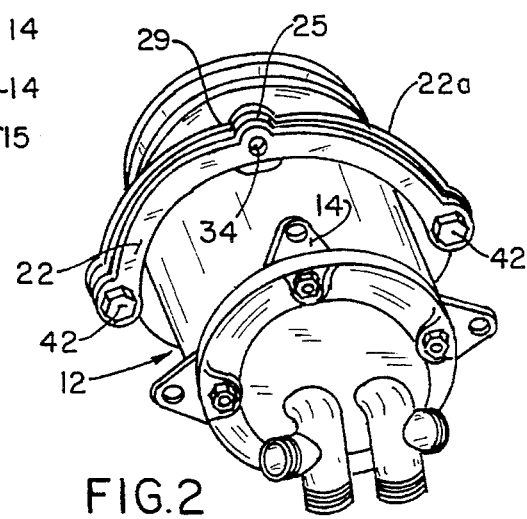
FIG. 2 is an isometric view showing the assembly mounted to the compressor.
Figure 3:
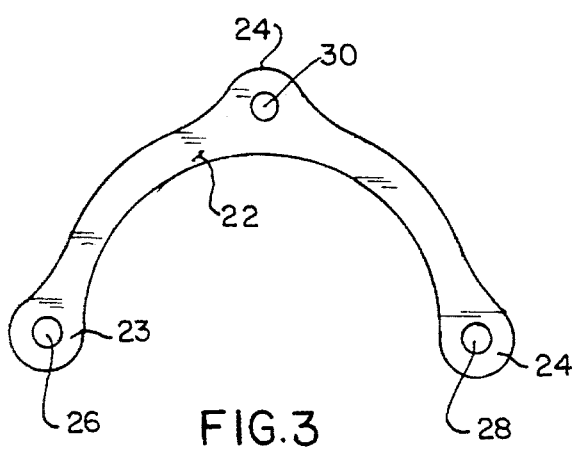
FIG. 3 is a front elevation view of the assembly constructed according to the principles of the present invention, the rear elevational view being substantially identical.
Figure 4:
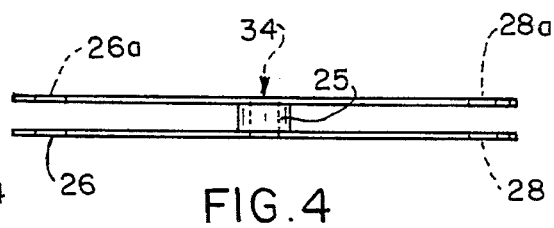
FIG. 4 is a top plan view of the assembly.
Figure 5:
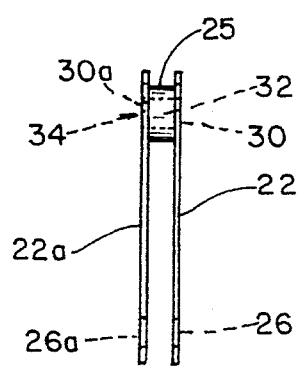
FIG. 5 is a side elevation view of the assembly prior to being connected to the compressor, the left and right sides being substantially identical.
Figure 6:
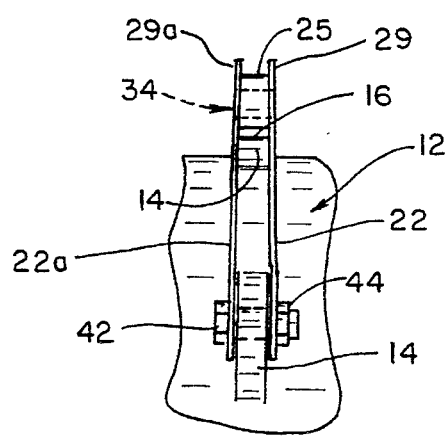
FIG. 6 is a side elevation view of the assembly shown connected to the compressor with part of a compressor flange being shown broken.

The mounting repair assembly constructed according to the principles of this invention is indicated in the preferred embodiment generally as 10 in FIGS. 1–6. The assembly 10 is adapted to securely connect to an automobile air-conditioner compressor 12 of the type comprising two sets of four projecting ears illustrated as 14. The ears 14 are for mounting the compressor 12 to an automobile chassis as known in the art. Each ear 14 has a bore 15 that extends circumferentially about the compressor housing. The ears 14 are positioned at approximately 90-degree intervals. The front lower ear is not shown. One projecting ear is shown broken, leaving a notched cavity at 16 in the ear.

The assembly 10 comprises two similarly shaped, generally C-shaped, bracket plates 22 and 22a. A bored spacer 25 which is separate from plates 22 and 22a, fits between the plates 22 and 22a. The bracket plate 22 has two ends 23 and 24, and two apertures 26 and 28 near each end 23 and 24, respectively. Bracket plate 22 has a humped projection 29 at its upper middle and a middle aperture 30 approximately equidistant between its ends 23 and 24. The bracket plate 22a likewise has two ends 23a and 24a and two apertures 26a and 28a near its ends which align with apertures 26 and 28 of bracket plate 22. Bracket plate 22a also has a projecting hump 29a and a middle aperture 30a approximately equidistant between its ends 23a and 24a, which aligns with the aperture 30 of bracket plate 22. The spacer 25 is positioned between the bracket plates 22 and 22a so that the bore 32 of spacer 25 is aligned with apertures 30 and 30a. The aligned spacer bore 32 and middle bracket apertures 30 and 30a comprise one continuous replacement aperture 34.

Mounting bolts 42 and nuts 44 provide means for connecting the apparatus 10 to the compressor. The bolts and nuts are used in conjunction with apertures 26–26a and 28–28a to connect bracket plates 22 and 22a respectively to the projecting ears 14 thereby securing the apparatus to the compressor.

The assembly 10 is designed to extend about the compressor 12. Given a typical automobile air-conditioner compressor, the interior curvature of assembly 10 is approximately a two-and-three-eighths-inch radius and the exterior curvature is approximately a two-and-seven-eighths-inch radius, with apertures 26 and 28 (as well as 26a and 28a) approximately five-and-three-fourths inches apart center to center. The bracket plates 22 and 22a are preferably metal of about 0.075 gauge thickness and the spacer 25 is preferably about three-eighths inch thick. Preferably all six apertures 26, 26a, 28, 28a, 30, and 30a as well as the bore of spacer 24 have about a three-eighths-inch diameter. The bracket plates 22 and 22a and spacer 25 are preferably plated for rust protection.

OPERATION

In operation, the cavity 16 of the broken compressor ear is chiseled, scraped, filed or otherwise worked on to substantially eliminate the remaining projecting ear structure (see FIG. 1). Bracket apertures 26 and 26a are placed on opposite sides of a projecting ear 14 approximately ninety degrees from the space previously provided by the broken ear. One of the bolts 42 is placed through one aperture 26, through the ear bore 14a, and then through the other aperture 26a. One of the nuts 44 is then secured snugly on the bolt. This procedure is repeated with apertures 28 and 28a and the other projecting ear 14 approximately ninety degrees from the broken ear, thereby firmly connecting bracket plates 22 and 22a to the projecting ears specifically and the compressor generally (see FIG. 2). Spacer 25 can then be placed so that its bore 32 is aligned with bracket apertures 30 and 30a. Bores 32, 30 and 30a thus aligned together comprise the replacement aperture 34, which is in the approximate position previously occupied by the bore of the broken ear. With the mounting apparatus 10 so installed, the compressor 12 can be mounted to the chassis of the automobile (not shown). In such mounting, the bolts 42 and nuts 44 hold the brackets securely to compressor 12. The central bolt 46 that typically is used for mounting a compressor is used to pass through the replacement aperture 34 to mount the compressor 12 to the chassis. A bolt (not shown) similar to bolt 46 passes through the mounting ear 14 directly in alignment with the broken ear 14 to further mount the compressor 12 to the chassis. When the compressor 12 and assembly 10 are mounted to the chassis, the plates 22 and 22a are bent inward by the compressive force of bolt 46 so that the distance from the outside of each of the plates 22 and 22a to each other at the area about apertures 30 and 30a is approximately the thickness of an ear 14 to which the bracket plate ends 23 and 23a, and 24 and 24a, are connected.

If desired, the spacer 25 can be integral with the plates 22 and 22a. The preferred embodiment has been illustrated with two bracket plates, although the replacement bore can be provided by use of a single bracket plate.

The assembly 10 can also be used without spacer 25 to reinforce and strengthen the ear structure before an ear is broken. In such case the plates 22 and 22a are mounted as shown without spacer 25, so that the plate apertures 30 are aligned with the aperture of the ear that would be in the position shown for the broken ear in the drawings.

The foregoing demonstrates that this invention is well adapted to attain the objects set forth together with the other advantages which are obvious and which are inherent to the structure and method. Although illustrated embodiments of the present invention are described herein with reference to the accompanying drawings, it is to be understood that the invention is not limited to those precise embodiments and that various other changes and modifications may be effective therein by one skilled in the art without departing from the scope or spirit of the invention.

I claim:

1. In an apparatus for mounting an automobile air-conditioner compressor of the type having projecting ears located about the compressor housing, which ears have bores extending therethrough for allowing the compressor to be mounted such as by bolts to the automobile chassis, and wherein an ear having a bore extending therethrough has been broken away from the housing, an improved apparatus for mounting an automobile air-conditioner compressor comprising:

a. a bracket shaped to extend about the compressor;
   b. means for connecting the bracket to at least two projecting ears; and
   c. the bracket having a replacement aperture which is located at a position which approximates the position previously occupied by the bore of the broken ear when the bracket is connected to the projecting ears, so that the compressor can be securely mounted to the automobile chassis.

2. The apparatus of claim 1 wherein the projecting ears are located circumferentially about the compressor housing are, wherein further:

the bracket is generally shaped so to extend around the compressor so that the means for connecting connects the bracket to two projecting ears located about 180 degrees from each other.

3. The apparatus as in claim 2, further comprising:

a. the bracket comprising two plates, each plate having an aperture near each of its ends so that each end of the plates has a pair of aligned apertures in the bracket plates;
   b. the connecting means comprising each end pair of bracket plate apertures being positioned so that they can each be aligned with the bores of corresponding compressor ears, and fastening members that extend through the bracket plate apertures and their corresponding compressor ear; and
   c. a spacer having a bore being located between the two bracket plates, and each of the bracket plates having a third middle aperture located approximately equidistant between the bracket plate ends, so that each of the third plate apertures is aligned with the spacer bore, the replacement aperture comprising the two middle apertures and the spacer bore.

4. The apparatus as in claim 3 wherein the two metal bracket plates are of stamped metal of about 0.075 gauge thickness and the spacer is about ⅜ inch thick.

5. In an apparatus for mounting an automobile air-conditioner compressor of the type having two sets of four projecting ears located circumferentially about the compressor housing, the ears of each set spaced approximately 90 degrees apart, which ears have bores extending therethrough for allowing the compressor to be mounted such as by bolts to the automobile chassis, and wherein an ear having a bore extending therethrough has been broken away from the housing, an improved apparatus for mounting an automobile air-conditioner compressor, comprising:

a. two bracket plates, each bracket plate being generally C-shaped to extend about the compressor, each bracket plate having a pair of ends, each bracket plate having a middle aperture located approximately equidistant between the bracket plate ends and a first aperture near one of the bracket plate ends and a second aperture near the other bracket plate end, the bracket plates being positioned so that the two middle apertures are aligned with each other, and the first and second apertures of one bracket plate are aligned respectively with the first and second brackets of the other bracket plate;

b. a spacer having a bore, the spacer being located between the two bracket plates approximately equidistant between the bracket plate ends, so that the spacer bore aligns with the middle aperture of each bracket plate;

c. means for connecting the bracket plates to two projecting ears located approximately 180 degrees from each other comprising, each end pair of bracket plate apertures being positioned so that they can each be aligned with the bores of corresponding compressor ears and fastening members that extend through the bracket plate apertures and their corresponding compressor ear; so that when the bracket plates are connected to the projecting ears, a replacement aperture, comprising the two middle apertures of the bracket plates and the spacer bore, is formed and located at a position which approximates the position previously occupied by the bore of the broken ear, to allow the compressor to be securely mounted to the automobile chassis.

* * * * *